United States Patent
Snyder et al.

(10) Patent No.: US 8,725,329 B1
(45) Date of Patent: May 13, 2014

(54) SCHEDULE-BASED METHODS AND SYSTEMS FOR CONTROLLING HYBRID MARINE PROPULSION SYSTEMS

(71) Applicant: Brunswick Corporation, Lake Forest, IL (US)

(72) Inventors: Matthew W. Snyder, Fond du Lac, WI (US); Thomas S. Kirchhoff, Fond du Lac, WI (US); Jason S. Arbuckle, Horicon, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 13/762,089

(22) Filed: Feb. 7, 2013

(51) Int. Cl.
*B63H 21/22* (2006.01)

(52) U.S. Cl.
USPC .......................... 701/21; 440/1; 440/3; 440/6

(58) Field of Classification Search
USPC ................ 701/21; 440/6, 1, 3, 84; 180/65.21, 180/65.245, 65.29; 320/104, 119–121
See application file for complete search history.

(56) References Cited

U.S. PATENT DOCUMENTS

| | | | |
|---|---|---|---|
| 1,332,631 A | 3/1920 | Morse | |
| 3,230,698 A | 1/1966 | Nettles | |
| 3,503,464 A | 3/1970 | Yardney | |
| 3,566,717 A | 3/1971 | Berman at al | |
| 3,650,345 A | 3/1972 | Yardney | |
| 3,703,642 A | 11/1972 | Balaguer | |
| 3,888,325 A | 6/1975 | Reinbeck | |
| 4,114,555 A | 9/1978 | O'Brien, Jr. | |
| 4,233,858 A | 11/1980 | Rowlett | |
| 4,338,525 A | 7/1982 | Kilgore | |
| 4,661,714 A | 4/1987 | Satterthwaite et al. | |
| 5,080,064 A | 1/1992 | Buslepp et al. | |
| 5,081,365 A | 1/1992 | Field et al. | |

(Continued)

FOREIGN PATENT DOCUMENTS

DE 101 53 586 A1 5/2002
DE 103 18 293 A1 11/2004

OTHER PUBLICATIONS

Web Page for PowerCharge Battery Charger HV Series—Overview; http://www.powerdesignersusa.com/powercharge_hv.htm, last visited Jan. 27, 2011 (one page).

(Continued)

*Primary Examiner* — Marthe Marc-Coleman

(74) *Attorney, Agent, or Firm* — Andrus Intellectual Property Law, LLP

(57) ABSTRACT

Systems and methods are for controlling of a hybrid propulsion system for a marine vessel. A control circuit controls an electric motor-generator according to at least two modes, including a first mode wherein the electric motor-generator receives power from a battery and rotates a driveshaft to drive a propulsor and a second mode wherein the electric motor-generator generates power to charge the battery based upon torque from an internal combustion engine. A time criteria and at least one user-desired operational characteristic of at least one of the internal combustion engine, electric motor-generator, and battery are input to the control circuit. Based on the time criteria and user-desired operational characteristic, the control circuit calculates a schedule for at least one of charging the battery with the electric motor-generator and discharging the battery to a house load of the marine vessel. The control circuit further controls operation of the electric motor-generator according to the schedule.

24 Claims, 9 Drawing Sheets

(56) References Cited

U.S. PATENT DOCUMENTS

| | | | |
|---|---|---|---|
| 5,301,764 A | 4/1994 | Gardner |
| 5,616,056 A | 4/1997 | Meissner |
| 5,835,876 A | 11/1998 | Hathaway et al. |
| 5,848,582 A | 12/1998 | Ehlers et al. |
| 5,880,575 A | 3/1999 | Itou et al. |
| 5,969,624 A | 10/1999 | Sakai et al. |
| 6,009,371 A | 12/1999 | Kobayashi |
| 6,133,707 A | 10/2000 | Kikuchi et al. |
| 6,273,771 B1 | 8/2001 | Buckley et al. |
| 6,396,161 B1 | 5/2002 | Crecelius et al. |
| 6,443,286 B1 | 9/2002 | Bratel et al. |
| 6,554,088 B2 | 4/2003 | Severinsky et al. |
| 6,587,765 B1 | 7/2003 | Graham et al. |
| 6,662,742 B2 | 12/2003 | Shelton et al. |
| 6,701,890 B1 | 3/2004 | Suhre et al. |
| 6,757,606 B1 | 6/2004 | Gonring |
| 6,758,198 B1 | 7/2004 | Suhre et al. |
| 6,800,004 B1 | 10/2004 | White et al. |
| 6,821,171 B1 | 11/2004 | Wynveen et al. |
| 6,846,208 B1 | 1/2005 | Goldmeer et al. |
| 6,857,918 B1 | 2/2005 | Lebreux et al. |
| 6,882,129 B2 | 4/2005 | Boskovitch et al. |
| 6,885,919 B1 | 4/2005 | Wyant et al. |
| 6,912,967 B1 | 7/2005 | Oats et al. |
| 6,915,781 B2 | 7/2005 | Rayl |
| 6,919,711 B2 | 7/2005 | Haydock et al. |
| 6,978,617 B2 | 12/2005 | Goldmeer et al. |
| 6,982,632 B2 | 1/2006 | Nagasaka et al. |
| 7,147,523 B2 | 12/2006 | Mori |
| 7,241,192 B2 | 7/2007 | Andersen et al. |
| 7,296,648 B2 | 11/2007 | Tatara et al. |
| 7,318,396 B1 | 1/2008 | Belter et al. |
| 7,381,107 B2 | 6/2008 | Ishikawa et al. |
| 7,473,149 B2 * | 1/2009 | Mizokawa ............ 440/6 |
| 7,482,767 B2 * | 1/2009 | Tether ................. 318/139 |
| 7,518,344 B2 | 4/2009 | Sihler |
| 7,530,864 B2 | 5/2009 | Kaji |
| 7,556,547 B2 | 7/2009 | Kaji |
| 7,565,939 B2 | 7/2009 | Ando et al. |
| 7,621,789 B2 | 11/2009 | Mizokawa |
| 7,645,174 B2 | 1/2010 | Chung et al. |
| 7,769,504 B2 | 8/2010 | Kaji |
| 7,808,211 B2 | 10/2010 | Pacholok et al. |
| 7,862,393 B2 | 1/2011 | Levander et al. |
| 8,039,976 B2 | 10/2011 | Sato et al. |
| 8,062,081 B2 | 11/2011 | Barrett et al. |
| 8,290,682 B2 | 10/2012 | Ewert et al. |
| 8,436,583 B2 | 5/2013 | Guang et al. |
| 2002/0005178 A1 | 1/2002 | Iwatani et al. |
| 2004/0163861 A1 | 8/2004 | Fukuda et al. |
| 2005/0106953 A1 | 5/2005 | Andersen et al. |
| 2006/0025025 A1 * | 2/2006 | Kitani et al. ............ 440/6 |
| 2006/0040791 A1 | 2/2006 | Nakajima et al. |
| 2006/0096555 A1 | 5/2006 | Buck |
| 2006/0166573 A1 | 7/2006 | Vetta et al. |
| 2007/0012493 A1 | 1/2007 | Jones |
| 2007/0062744 A1 | 3/2007 | Weidenheimer et al. |
| 2008/0041327 A1 | 2/2008 | Lewis et al. |
| 2008/0064273 A1 | 3/2008 | Mizokawa |
| 2008/0120516 A1 | 5/2008 | Thor |
| 2009/0156068 A1 | 6/2009 | Barrett et al. |
| 2009/0176417 A1 | 7/2009 | Rembach et al. |
| 2009/0284228 A1 | 11/2009 | Kumar |
| 2009/0288896 A1 | 11/2009 | Ichikawa |
| 2009/0302616 A1 | 12/2009 | Peterson |
| 2010/0105259 A1 | 4/2010 | Wejrzanowski et al. |
| 2010/0123436 A1 | 5/2010 | Herrod et al. |
| 2010/0125383 A1 | 5/2010 | Caouette |
| 2010/0144219 A1 | 6/2010 | Balogh et al. |
| 2010/0250041 A1 | 9/2010 | Li |
| 2011/0195618 A1 | 8/2011 | Arbuckle et al. |

OTHER PUBLICATIONS

Web Page for PowerCharge Battery Charger HV Series—Specifications; http://www.powerdesignersusa.com/powercharge_hv_specs.htm, last visited Jan. 27, 2011 (two pages).

Brochure PageFor PowerCharge Battery Charger HV Series and PowerCharge HV Series Product Matrix (two pages).

* cited by examiner

SCHEDULE-BASED METHODS AND SYSTEMS FOR CONTROLLING HYBRID MARINE PROPULSION SYSTEMS

FIELD

The present disclosure relates to marine vessels, and particularly to hybrid propulsion systems for marine vessels and methods for controlling hybrid propulsion systems for marine vessels.

BACKGROUND

U.S. Pat. No. 6,273,771, expressly incorporated herein in entirety by reference, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,885,919, expressly incorporated herein in entirety by reference, discloses process by which the operator of a marine vessel can invoke the operation of a computer program that investigates various alternatives that can improve the range of the marine vessel. The distance between the current location of the marine vessel and a desired waypoint is determined and compared to a range of the marine vessel which is determined as a function of available fuel, vessel speed, fuel usage rate, and engine speed. The computer program investigates the results that would be achieved, theoretically, from a change in engine speed. Both increases and decreases in engine speed are reviewed and additional theoretical ranges are calculated as a function of those new engine speeds. The operator of the marine vessel is informed when an advantageous change in engine speed is determined.

Abandoned U.S. patent application Ser. No. 11/505,075, expressly incorporated herein in entirety by reference, discloses hybrid marine propulsion systems that connect both an internal combustion engine and an electric motor to a propeller in torque-transmitting relation so that the propeller can selectively receive torque provided by the engine, torque provided by the motor, and a sum of the torque provided by the engine and the motor.

U.S. patent application Ser. No. 13/100,037, filed May 3, 2011, expressly incorporated herein in entirety by reference, discloses systems and methods for operating a marine propulsion system. The systems and methods utilize an internal combustion engine and an electric motor that is powered by a battery, wherein the internal combustion engine and the electric motor each selectively power a marine propulsor to propel a marine vessel. A control circuit is operated to control operation of the system according to a plurality of modes including at least an electric mode wherein the electric motor powers the marine propulsor and a hybrid mode wherein the internal combustion engine powers the marine propulsor and provides power for recharging the battery. An operator-desired future performance capability of the hybrid marine propulsion system is input to the control circuit, which selects and executes the plurality of modes so as to provide the operator-desired future performance capability.

U.S. patent application Ser. No. 12/329,166, filed Dec. 5, 2008, expressly incorporated herein in entirety by reference, discloses a marine propulsion system configured to allow many different combinations and interconnections between three internal combustion engines, three generators, two motors, two clutches, two marine propulsion devices, and an electrical storage device. By appropriately interconnecting these devices in advantageous combinations, energy consumption can be reduced, operational efficiency of the engine can be improved, and redundancy can be provided in the event that one or more components are disabled.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In some examples, methods are for controlling a hybrid propulsion system for a marine vessel. The methods comprise (1) controlling with a control circuit an electric motor-generator according to at least two modes, including a first mode wherein the electric motor-generator receives power from a battery and rotates a driveshaft to drive a propulsor and a second mode wherein the electric motor-generator generates power to charge the battery based upon torque from an internal combustion engine; (2) inputting to the control circuit a time criteria and at least one user-desired operational characteristic of at least one of the internal combustion engine, electric motor-generator, and battery; (3) based on the time criteria and user-desired operational characteristic, calculating with the control circuit a schedule for at least one of charging the battery with the electric motor-generator and discharging the battery to a house load of the marine vessel; and (4) controlling with the control circuit operation of the electric motor-generator according to the schedule.

In other examples, hybrid propulsion systems are for a marine vessel. A marine propulsor is coupled to a driveshaft. The propulsor propels the marine vessel upon rotation of the driveshaft. An electric motor-generator is coupled to an internal combustion engine so that torque from the internal combustion can be received by the electric motor-generator. The electric motor-generator operates in at least two modes, including a first mode wherein the electric motor-generator rotates the driveshaft to drive the propulsor and a second mode wherein the electric motor-generator generates power based upon torque from the internal combustion engine. A battery is electrically coupled to the electric motor-generator and provides power to the electric motor-generator in the first mode and is charged by the electric motor-generator in the second mode. The battery also is electrically coupled to and discharges power to a house load of the marine vessel. A control circuit controls operation of the internal combustion engine and the electric motor-generator in the first mode and in the second mode. A user input device inputs a time criteria and at least one user-desired operational characteristic of at least one of the internal combustion engine, electric motor-generator, and battery. Based on the time criteria and the user-desired operational characteristic, the control circuit calculates a schedule for at least one of charging the battery and discharging the battery to the house load. The control circuit controls operation of the electric motor-generator according to the schedule.

BRIEF DESCRIPTION OF THE DRAWINGS

Examples of schedule-based systems and methods for operating hybrid marine propulsion systems are described with reference to the following figures. The same numbers are used throughout the figures to reference like features and components.

DETAILED DESCRIPTION OF THE DRAWINGS

Figure 1:
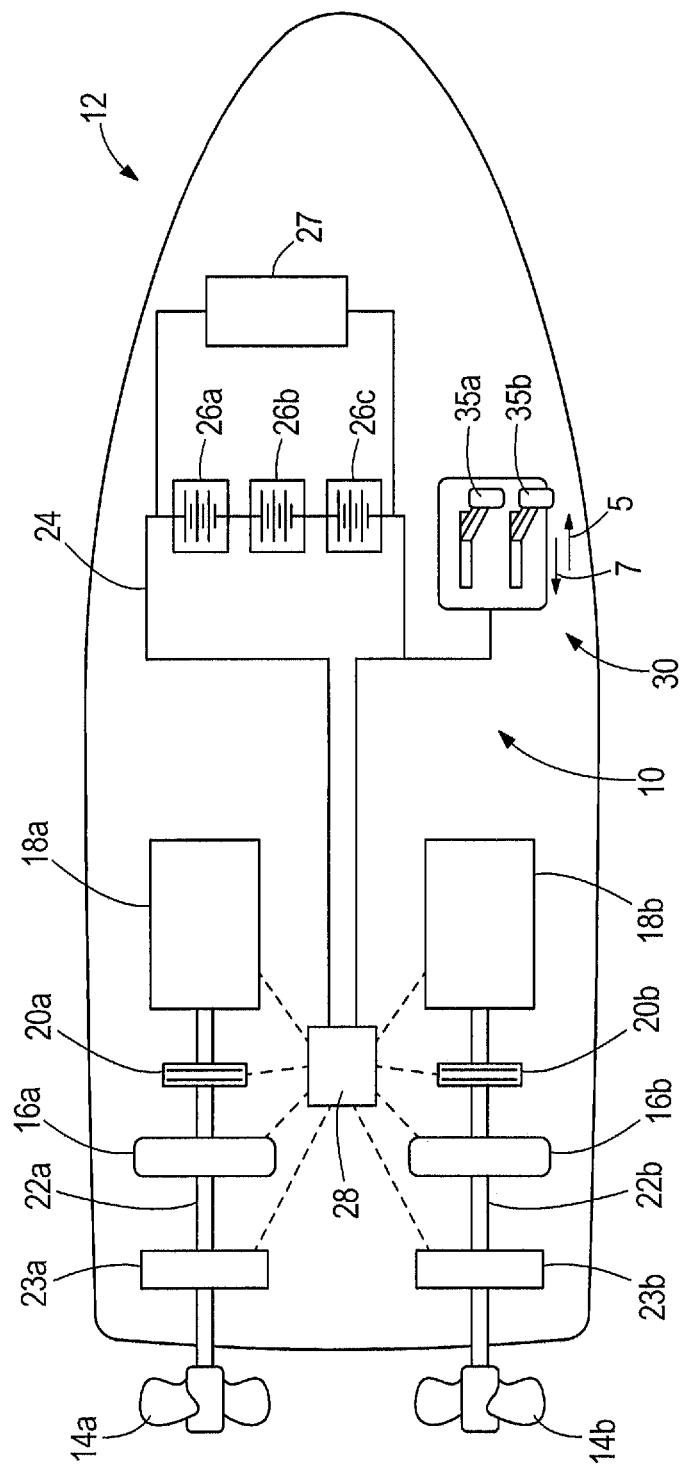
FIG. 1 is a schematic view of an exemplary marine vessel and hybrid marine propulsion system.

FIG. 1 schematically depicts a hybrid marine propulsion system 10 for a marine vessel 12. The system 10 includes among other things one or more propulsors 14a, 14b (collectively referred to herein as "propulsors 14"), which can include any type of device for propelling the marine vessel 12, including but not limited to one or more propellers (as shown in FIG. 1), impellers, stern drives, pod drives, and/or the like. As described herein, the propulsors 14 can each be driven into rotation by one or more electric motor-generators 16a, 16b (collectively referred to herein as "motor-generators 16"), one or more internal combustion engines 18a, 18b (collectively referred to herein as "engines 18"), and/or a combination of the electric motor-generators 16 and engines 18.

The engines 18 can include diesel engines or any other conventional internal combustion-type engines for applying torque to and thereby rotating driveshafts 22a, 22b (collectively referred to herein as "driveshafts 22") in a conventional manner. In the example shown, the system 10 also includes one or more clutches 20a, 20b (collectively referred to herein as "clutches 20") for connecting the engines 18 and the driveshafts 22 in a torque-transmitting manner (i.e. such that rotation of the engines 18 applies torque to and thereby can cause rotation of the driveshafts 22). The clutches 20 can include any conventional type of clutch for connecting and disconnecting engines 18 and driveshafts 22 in the noted torque-transmitting manner, such as for example friction clutches, or more preferably dog clutches because the speeds of the motor-generators 16 and engines 18 are typically synchronized (i.e. substantially matched) before the clutches 20 are engaged or disengaged. Conventional transmissions 23a, 23b (collectively referred to herein as "transmissions 23") connect the other ends of driveshafts 22 to the propulsors 14 in a torque-transmitting manner, so that rotation of the driveshafts 22 causes movement of the propulsors 14 for forward and/or reverse propulsion in a conventional manner. The transmissions 23 are configured to connect the driveshafts 22 to the propulsors 14 in forward gear wherein forward rotation is applied by the transmissions 23 to the propulsors 14 for forward thrust, reverse gear wherein reverse rotation is applied by the transmissions 23 to the propulsors 14 for reverse thrust, and neutral gear wherein no rotation is applied by the transmissions 23 to the propulsors 14.

Figure 9:
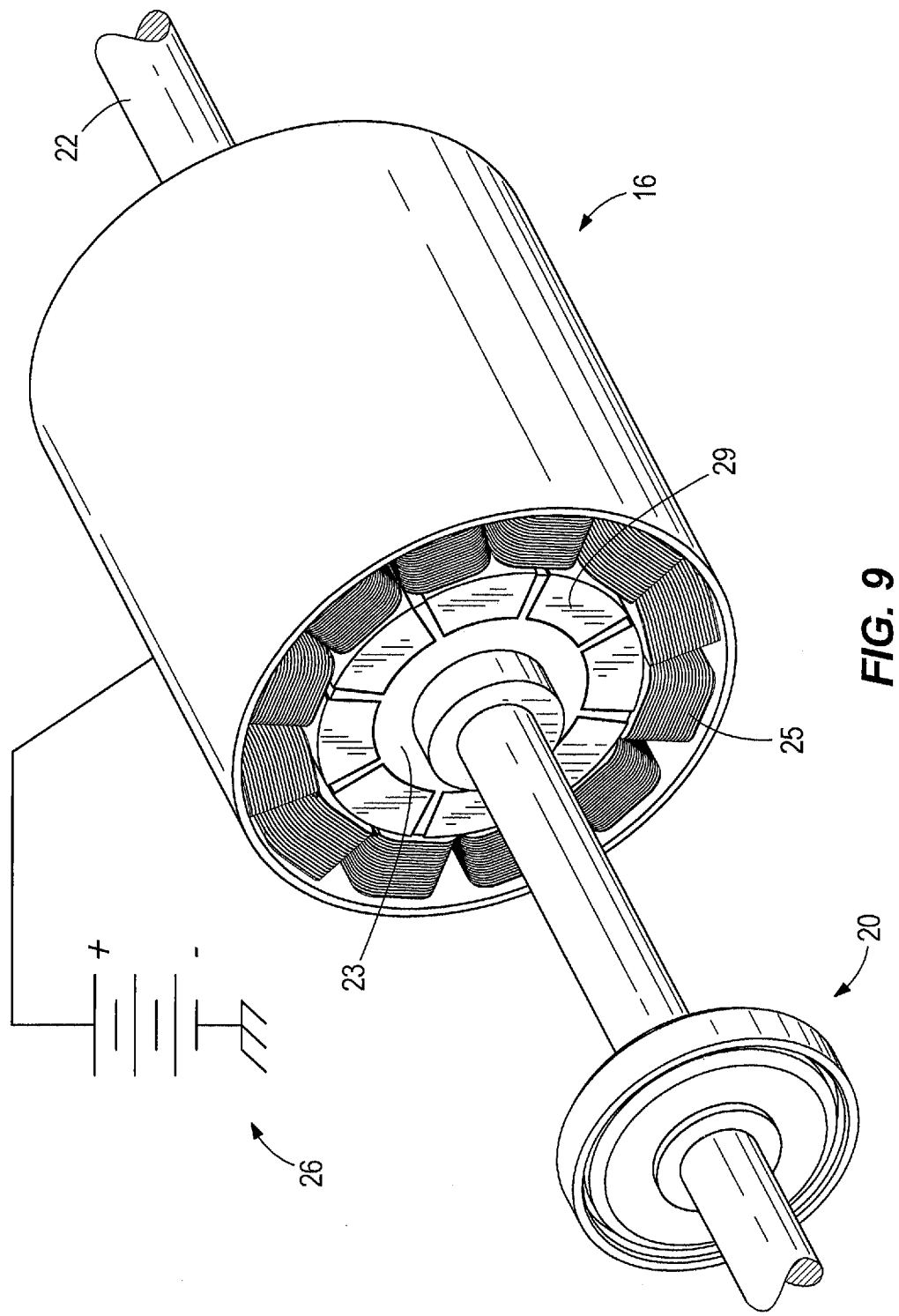
FIG. 9 is a perspective view of an electric motor-generator and driveshaft combination.

The motor-generators 16 are located between the clutches 20 and transmissions 23 and are configured to engage with and/or drive (i.e. apply torque to and/or rotate) the driveshafts 22 at the same time or separately from the engines 18. The motor-generators 16 can alternately apply positive and negative torque on the driveshafts 22 with respect to the positive torque applied by the engines 18. A positive or assisting torque of the motor-generator 16 in one direction thus can cause positive rotation of the driveshafts 22. A negative or loading torque of the motor-generator 16 in an opposite direction thus can slow or impede positive rotation of the driveshafts. In the example shown, the driveshafts 22 extend through and form a part of the motor-generators 16. FIG. 9 depicts one example of a motor-generator 16 wherein the driveshaft 22 forms part of a rotor assembly 23. The motor generator 16 generates a positive or assisting torque on the rotor assembly 23 by converting electrical current into a magnetic field in a stator assembly 25. This magnetic field interacts with magnets 29 on the rotor assembly 23 and creates a torque on the rotor assembly 23 and driveshaft 22. The motor-generator 16 uses power from one or more rechargeable storage batteries (e.g. 26a, 26b, 26c shown in FIG. 1) while in a positive or assisting torque mode. Alternatively, the motor-generator 16 can take the rotational motion of the rotor assembly 23 and create a magnetic field in the stator assembly 25 while in a negative or loading torque state. This induced magnetic field results in an electric current which can be used to provide recharging current to the one or more batteries 26a, 26b, 26c or supply power to a house load 27. Arrangements where the motor-generators 16 and driveshafts 22 are oriented differently with respect to each other or are separate components that are operatively coupled are also contemplated and are part of this disclosure. For example, the motor-generators 16 can be linked in torque-transmitting relation with the driveshafts 22 via a gearbox containing for example planetary gears, sun gears, and/or ring gears for engaging the motor-generators 16 with the driveshafts 22 in the noted torque-transmitting manner.

The system 10 also includes a plurality of rechargeable storage batteries 26a, 26b, 26c (collectively herein referred to as "batteries 26"), which are electrically connected to the motor-generators 16. The batteries 26 provide power to the motor-generators during operation of the motor-generators 16 to apply torque to the driveshafts 22. In FIG. 1, three batteries 26a, 26b, 26c are shown in banks and are coupled in series with each other and to the motor-generators 16; however the number of batteries 26 and the configuration thereof can vary from that shown. One or more batteries could be employed. One commercial type of rechargeable battery 26 for use in the present system 10 is available from Valence Technology inc. Other similar types of rechargeable batteries can be commercially obtained and used in the present system 10. In use, the batteries 26 provide power to the motor-generator 16 to facilitate its operation. The batteries 26 are also electrically connected to and provide power to a house load 27 of the marine vessel 10 when the system 10 is not connected to a shore power source. The house load 27 can include any electrical power drawing component on the marine vessel 10 other than the motor-generator 26 and its related control circuitry described herein below. For example the house load 27 can include radios, air conditioning, microwave ovens, televisions, and/or other like electrical components on-board the marine vessel 10.

The motor-generators 16 are also configured to generate power for recharging the batteries 26. More specifically, the engines 18 can be connected to and cause rotation of the driveshafts 22 via the clutches 20, as described herein above. The motor-generators 16 can apply negative torque on the driveshafts 22, as described herein above, and thereby function as a conventional generator that generates power from rotation of the driveshafts 22 by the engine 18. The power generated by the motor-generator can then be applied to the batteries 26 to recharge the batteries 26.

As described herein above, the engines 18, clutches 20, motor-generators 16 and transmissions 23 are configured to provide forward, neutral, and reverse operations of the propulsors 14 in a conventional "parallel drive hybrid arrangement"; however the examples shown and described herein are not limited to this arrangement and the concepts discussed herein are applicable to other types of parallel and/or non-parallel (e.g. series) hybrid marine propulsion configurations. In a conventional parallel hybrid drive arrangement, typically the engine 18 is a primary source of power to drive the propulsor 14 and the motor-generator 16 is a co-primary or a secondary source of torque to drive the propulsor 14. Alternatively, in a series hybrid drive arrangement, generally the motor-generator 16 is the primary source of torque to drive the propulsor 14 and the engine 18 is typically used principally or solely to drive the motor-generator 16 as a generator to supply electrical power to the battery 26.

Figure 2:
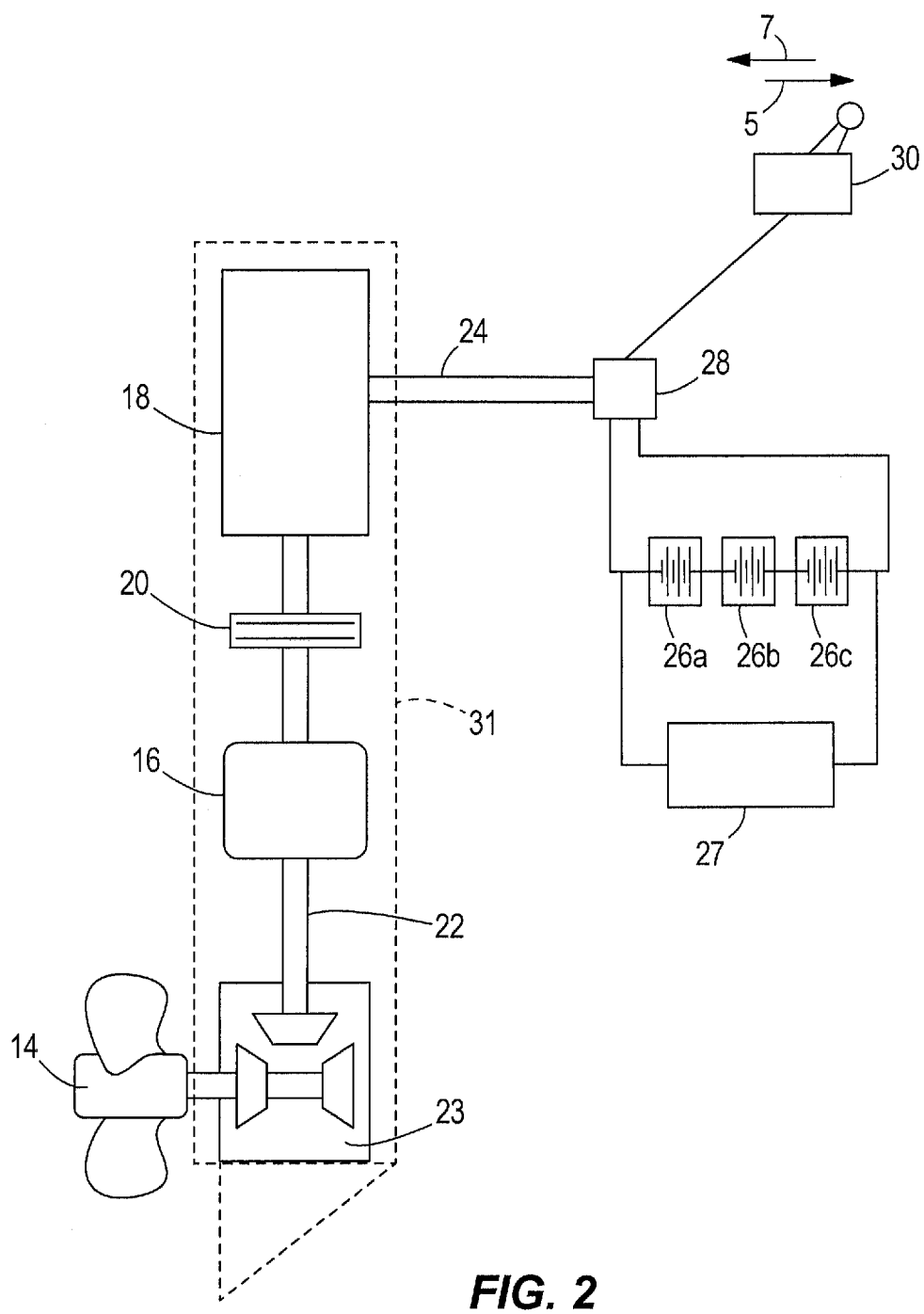
FIG. 2 is a schematic view of another exemplary hybrid marine propulsion system.

FIG. 1 depicts an inboard/outboard marine arrangement; however the concepts disclosed in this application are applicable to other types of marine propulsion systems, such as outboard motor arrangements, stern drive arrangements, and/or the like. FIG. 2 depicts one example of an outboard motor 31 having reference numbers corresponding to the structures described with reference to FIG. 1. The principles disclosed above equally apply to the configuration shown in FIG. 2. For example, the system 10 could include two outboard motors 31.

Figure 3:
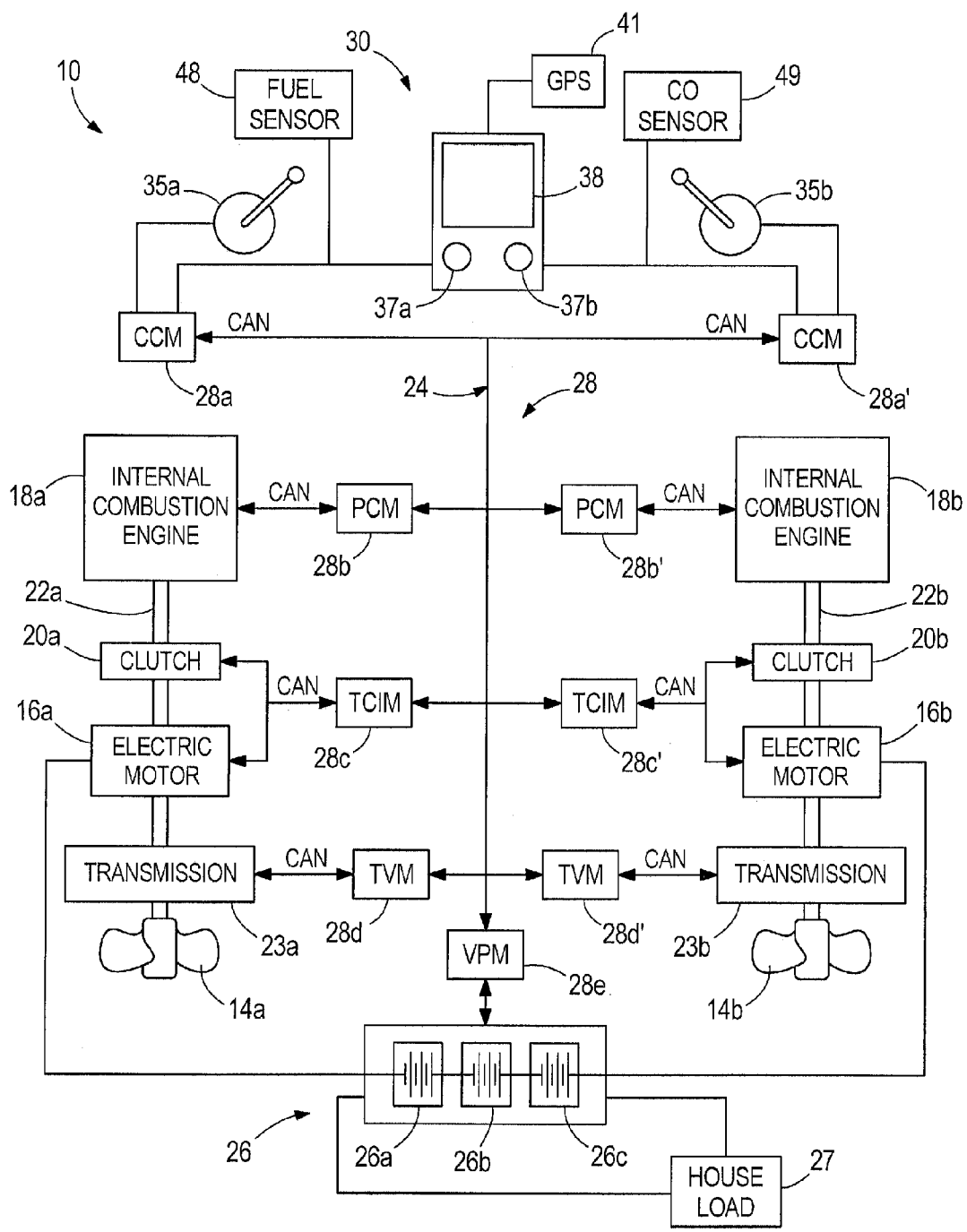
FIG. 3 is a more detailed schematic view of an exemplary hybrid marine propulsion system.

Referring to FIG. 3, the exemplary system 10 also includes a control circuit 28 having a memory and a programmable processor. As is conventional, the processor can be communicatively connected to a computer readable medium that includes volatile or nonvolatile memory upon which computer readable code is stored. The processor can access the computer readable code and the computer readable medium upon executing the code carries out the functions as described herein. In this particular example, the control circuit 28 comprises a controller area network bus 24 (CAN bus) for operating the system 10 in a plurality of operational modes. An example of a CAN-type system is disclosed in U.S. Pat. No. 6,273,771, which is incorporated herein by reference. The CAN bus 24 is schematically shown and includes a plurality of control circuit sections 28a-28e, 28a'-28d'. The CAN bus 24 is multi-master broadcast serial bus that connects the control circuit sections 28a-28e, 28a'-28d' associated with various devices such as the engines 18, clutches 20, and motor-generators 16 so that the control circuit sections may communicate with one another without a host computer.

Each control circuit section 28a-28e, 28a'-28d' is able to send and receive messages via the CAN bus 24, but not simultaneously. Messages are sent to all control circuit sections 28a-28e, 28a'-28d' on the CAN bus 24. The devices are not connected directly to the CAN bus 24, but are connected through a host processor, a CAN controller, and a transceiver at each control circuit section 28a-28e, 28a'-28d'. The host processor interprets received messages and decides which messages it will transmit itself. Associated sensors, actuators and devices (such as the engines 18, clutches 20, and motor-generators 16) are connected to the host processor. The CAN controller is a hardware component with a synchronous clock. The CAN controller stores received bits serially from the CAN bus 24 until an entire message is available, which can then be fetched by the host processor. Additionally, the CAN controller stores messages the host processor wants to transmit, and then transmits the bits serially onto the CAN bus 24. The transceiver adapts signal levels from the CAN bus 24 to levels that the CAN controller expects, and converts signals received from the CAN controller into signals that are sent onto the CAN bus 24. The configuration of the control circuit 28 and sections 28a-28e, 28a'-28d', can vary significantly. For example, the control circuit 28 does not need to include a CAN bus 24 or the separately located sections and can instead comprise a single processor and memory located at one location. Conversely the control circuit 28 can include more sections than those shown and sections located at different locations than those shown and inter-coupled by a CAN bus or any other conventional communication link, which can be wired or wireless.

In the example shown in FIG. 3, the CAN bus 24 includes command control sections 28a, 28a' (referred to herein as "CCMs 28a"), which receive user inputs from at least one user input device 30. The user input device 30 can include conventional combination throttle/shift levers 35a, 35b, mode selection buttons 37a, 37b, and/or a display/touch screen 38 connected to the CAN in the conventional manner. The user input device 30 is also not limited to these configurations and can additionally or alternatively comprise other devices for inputting commands to the system 10, such as fewer or more input buttons and/or keys than that shown, joysticks, touch screens, and/or the like. In this example, the user input device 30 is specially configured to receive both time criteria and user-desired operational characteristics of at least one of the engines 18, motor-generators 16, and batteries 26, as will be described further herein below with reference to FIG. 4. Actuation of the user input device 30 is communicated to CCMs 28a via the CAN BUS 24 in the conventional manner.

The CCMs 28a are programmed to convert the user inputs into electronic commands and then send the commands to other sections in the system 10 for controlling components of the system 10. In this example, the other sections include transmission/engine control circuits (PCM) 28b, 28b' (referred to herein after as PCMs 28b) that control engine/transmission/shifting and read signals regarding transmission state and output speed. Also, thermal, clutch motor-generator interface modules (TCIM) 28c, 28c' (referred to herein after as TCIMs 28c) control the cooling systems for the system 10, clutches 20, and provide communication interface between the CAN BUS 24 and the motor-generators 16 for controlling rate of charge (ROC) of the batteries 26, among other things. Drive control modules (TVM) 28d, 28d' (referred to herein after as TVMs 28d) control features of the propulsors 14, for example controlling a pod drive to a particular steering angle. The control circuit sections further include a vessel power module VPM 28e that monitors the state of charge (SOC) of the batteries 26 and communicates this information to the CCMs 28a, and further controls operation of the batteries 26 for discharging power to the motor-generator 16 and to the house load 27. Again, the control circuit 28 shown in FIG. 3 is exemplary and could be significantly changed and still fall within the scope of the present disclosure and achieve the system's functional activities set forth herein.

During operation of the marine vessel 12, the control circuit 28 is programmed to switch amongst several modes of control. For example, in "Engine Mode", all of the driving force to the propulsors 14 is provided by the engines 18. In this mode, the CCMs 28 command the TCIMs 28 to control the clutches 20 to couple the engines 18 to the driveshafts 22. The CCMs 28 further command the PCMs 28b to operate the engines 18 to thereby apply torque to and rotate the driveshafts 22, thus providing power to the propulsors 14 via the transmissions 23. In "Electric Mode", all of the driving force to the propulsors 14 is provided by the motor-generators 16. In this mode, the CCMs 28 command the TCIMs 28c actuate the clutches to uncouple the engines 18 and driveshafts 22. The CCMs further command the TCIMs to operate the motor-generators 16 to apply torque to and thus rotate the driveshafts 22, thus providing rotation to the propulsors 14 via the transmissions 23. A "Hybrid Mode" includes either or both of a "Hybrid Assist Mode", wherein driving force to the propulsors 14 is provided by a combination of the engines 18 and the motor-generators 16 and a "Hybrid Generation Mode" wherein the motor-generators 16 charge the batteries 26. In Hybrid Assist Mode, the CCMs command the TCIMs to control the clutches 20 to couple the engines 18 to the driveshafts 22. The CCMs 28 further command the PCMs to operate the engines 18 and the TCIMs to operate the motor-generators 16 to rotate the driveshafts 22, thus providing combined torque to the driveshafts 22 and providing power to the propulsors 14 via the transmissions 23. In Hybrid Generation Mode, the CCMs 28a command the PCMs 28b and TCIMs 28c to control the engines 18 and clutches 20, respectively, to couple the engines 18 to the driveshafts 22 and rotate the driveshafts 22. The CCMs 28a further command the TCIMs 28c to cause the motor-generators 16 to apply toque on the rotating driveshaft 22 so as generate power for recharging the batteries 26 from the rotational force provided by the engines 18. During the noted engine mode, electric mode and hybrid mode, the CCMs 28 are also programmed to command the VPM 28e to control the batteries 26 as necessary to provide power to the motor generators 16 and/or to the house load 27.

The systems 10 disclosed herein are thus capable of switching between the various modes of operation while the engines 18 are running and/or while the motor-generators 16 are running and with the transmissions 23 in neutral or in gear. For example, it is often desirable to switch into Electric Mode when operating the vessel 12 at low speeds to thereby provide quieter vessel operation and more fuel-efficient vessel operation. It is often desirable to switch into Hybrid Regeneration Mode when the power of the plurality of batteries 26 is low to thereby draw recharging current from the engines 18. Which mode of operation is utilized at any given time can be based upon user inputs provided by the user input device 30, and/or specific operating conditions of the vessel 12, as described further herein below.

The marine vessel 12 can also include at least one GPS receiver 41, for example provided at the user interface 30. The GPS receiver 41 optionally can have its own microprocessor having computer readable medium and executable code, as well as a memory. The GPS receiver 41 is configured to receive GPS satellite signals and calculate the current global position of the marine vessel 12, as well as the current speed of the marine vessel in terms of speed over ground (SOG) and course over ground (COG) and communicate this information to the control circuit 28. The GPS receiver 41 is also configured with a clock for providing current time to the control circuit 28. A suitable type of GPS receiver is available commercially from Maretron. The control circuit 28 is also configured to display on the display/touch screen 38, for example located at the user interface 30, information regarding the current global position and operational characteristics of the marine vessel 12. Alternately, the control circuit 28 could be configured to display the information on another display such as a standard video display and/or the like. The type of display can vary and is not critical.

During research and development of hybrid marine propulsion systems for marine vessels, the present inventors have realized that it is desirable to utilize the batteries 26 to provide power to both the motor-generators 16 and the house load 27, for example when the vessel 12 is not connected to a source of power from shore. This makes it possible to omit a conventional dedicated electric generator that is typically provided to power the house load 27. It is thus desirable to utilize the motor-generators 16 of the system 10 for the dual purpose of generating power for both the motor generators 16 and the house load 27, thus saving cost and valuable design space on the vessel 10. However, while the batteries 26 typically have significant capacity, in situations where the engines 18 are not operating, the batteries 26 will eventually discharge to a state where they can no longer provide power to the house load 27. To avoid this situation, known hybrid marine propulsion systems would undesirably require the user to manually control the starting/stopping of the engines 18 in order to recharge the batteries 26, as described herein above. This has several clear drawbacks, including requiring the user to continuously maintain watch over the system and then start and stop the system when needed. This is inefficient and can be burdensome to the user. Prior art systems can also waste fuel because in some instances the engines 18 will idle without regeneration, for example if the user does not maintain watch over the system and the batteries 26 become fully charged with the engine 18 still running. In view of these disadvantages in the prior art, the present inventors have sought to provide hybrid marine propulsion systems 10 that allow for schedule-based, automatic control of the engines 18 and motor-generators 16 in order to provide generator-like operation without requiring tedious user interaction. The inventors have sought to provide such systems 10 that allow for such automatic operation so that the user does not need to directly manage circuit breakers or consider charge levels, or other such burdensome details.

Figure 4:
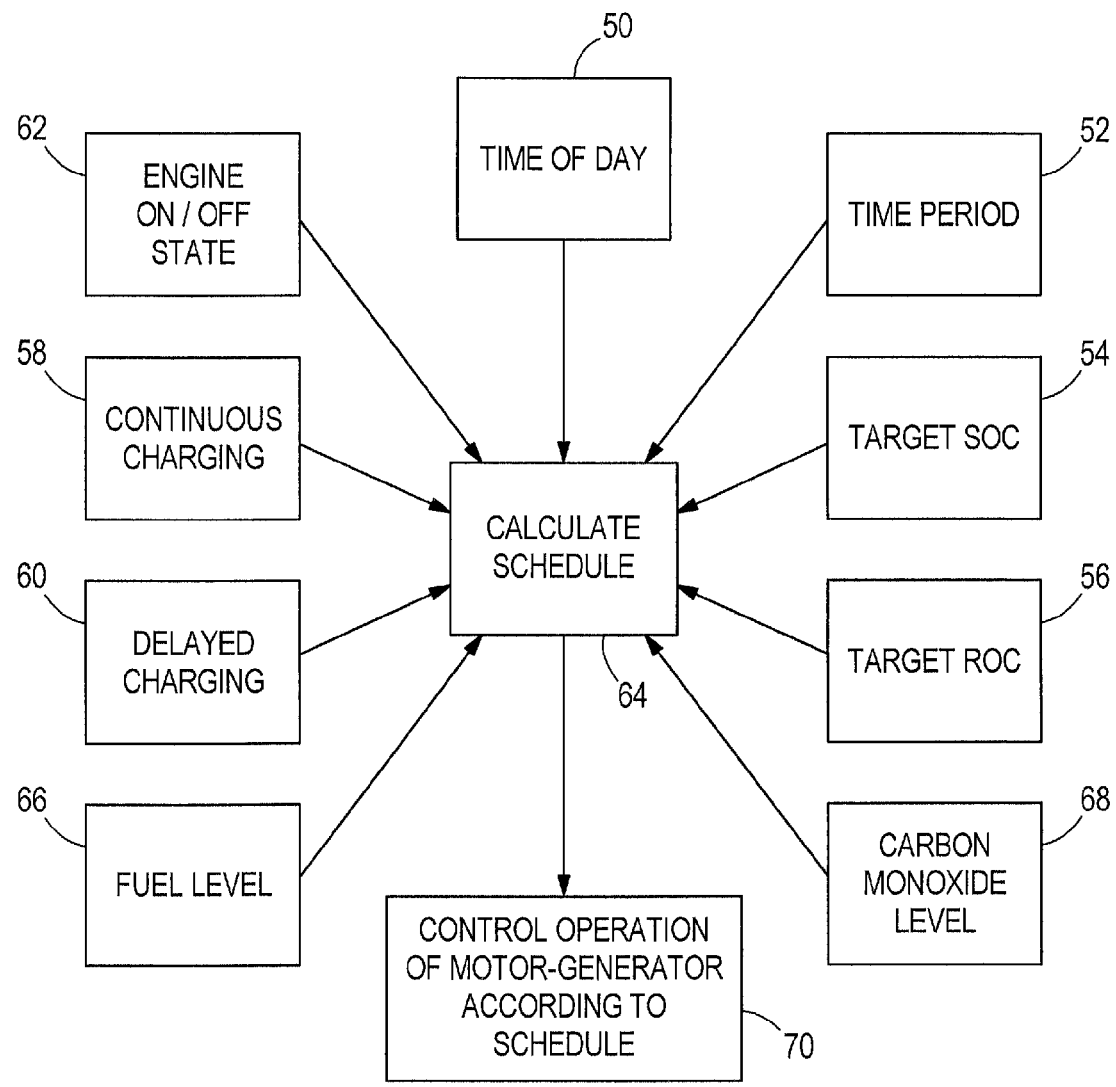
FIG. 4 is a chart illustrating time criteria and user-desired operational characteristics of the internal combustion engine, electric motor-generator, and battery.

According to the examples described herein, the user input device 30 of the system 10 is configured to allow the user to input both (1) time criteria and (2) at least one user-desired operational characteristic of at least one of the engines 18, motor-generators 16 and batteries 26. The nature of the time criteria and user-desired operational characteristic(s) can vary. Referring to FIG. 4 and the listing herein below, the time criteria can include a time of day 50 or a time period 52 having a start time and an end time, or other time-based criteria related to operation of the system 10. In other examples, the time criteria can optionally include:

Time Criteria
Time of day
Available time of battery operation remaining
Necessary time to charge battery
Time of day at which the system should stop charging the batteries
Time of day at which the system should begin charging the batteries
Time of day at which the batteries are desired to be at full charge The user-desired operational characteristic(s) can include for example a target state of charge (SOC) 54 of the batteries

26, a target rate of charge (ROC) 56 of the batteries 26, a request for continuous charging 58 of the batteries 26 during the time criteria, a request for delayed charging 60 of the batteries 26 during the time criteria, and/or an on-off state 62 of one or more of the engines 18. In other examples, the user-desired operational characteristics can optionally include:

ROC
Rate of charge of the batteries
Rate of charge of the batteries
Rate of discharge of the batteries
Desired nominal charging output (function of RPM, Load) of the system
Desired maximum charging output (function of RPM, Load) of the system
Desired minimum charging output (function of RPM, Load) of the system
SOC
Battery state of charge
Maximum allowed battery state of charge
Minimum allowed battery state of charge
Desired maximum battery state of charge
Desired minimum battery state of charge
Desired nominal battery state of charge
Engine On/Off State
All engines remain off or unavailable
All engines remain on or available
Desired maximum number of engines available for charging
Desired minimum number of engines available for charging Based upon a particular combination of time criteria and user-desired operational characteristic(s) entered into the input device 30, the control circuit 28, for example at the CCMs 28*a*, is configured to calculate a schedule 64 for charging the batteries 26 by operating the motor-generator 16 and for discharging the batteries 26 to the motor-generators 16 and the house load 27 of the marine vessel 12 within the time criteria. The particular schedule that is calculated will vary depending upon the combination of inputs to the user input device 30. Thereafter the charging and discharging operations are completed by operating the system 10 according to one or more of the Engine, Electric, and Hybrid modes discussed herein above according to the schedule.

The time criteria and user-desired operational characteristics can be input by the user to the input device 30 via for example the via the display/touchscreen 38, the mode selection buttons 37*a*, 37*b* or other devices such as a keyboard, voice commands, input buttons or keys and/or the like. In some examples, the combination of time criteria and user-desired operational characteristic(s) can be input in the form of a "pre-set mode" that is stored in the memory of the control circuit 28 and programmed during set up of the system 10. For example the memory of the control circuit 28 can have a stored "Sleep Mode", having stored time criteria that includes a time period having a beginning time of for example 10:00 pm and an ending time of for example 7:00 am and also stored operational characteristics requiring the system to achieve a preset or stored target maximum state of charge at the beginning time and a preset or stored target minimum state of charge at the end time. The "Sleep Mode" can also include a preset or stored operational characteristic requesting the system 10 delay charging as long as possible within the time period, while still achieving the target minimum state of charge at the end time. Again, the combination of time criteria and user-desired operational characteristics and derivative schedule can be different in different examples.

In other examples the combination of time criteria and user-desired operational characteristic(s) can each be entered via the input device 30, as described herein above. There are many different variations of time criteria and operational characteristics that can be entered, and therefore the control circuit 28 can be programmed to calculate unique schedules based upon the particular combinations of inputs to the user input device 30. For example, the user can input a plurality of time periods throughout a calendar day and request the system 10 undertake different charging profiles for the batteries 26 during each time period. One example could be to request the system 10 to employ a stored target minimum charging output (rate of charge) beginning at 8 am, then employ a stored target nominal charging output (rate of charge) that is greater than the target minimum charging output beginning at 10 am. Thereafter, beginning at 7 pm, the user could request the system 10 to achieve a stored maximum state of charge of the battery 26 by 9 pm, at which time the user could request the system 10 to turn the engines 18 off. The control circuit 28 can thus advantageously be programmed to operate the system based on the inputs of time criteria and operational characteristic(s) to thereby provide a computer-controlled system for maintaining charge and readiness of the batteries 26 without user-interaction during the time criteria designated by the user.

With continued reference to FIGS. 3 and 4, the system 10 further includes a fuel level sensor 48 that senses and communicates fuel level of the system 10, particularly the amount of fuel available for combustion in the engine 18. The fuel level sensor 48 communicates the noted fuel level to the control circuit 28, for example the CCMs 28*a*. Fuel level sensors 48 for sensing and communicating fuel level to a control circuit 28 are known in the art, one example of which can be commercially purchased from Mercury Marine as fuel level sensor, part number 851052Q. The control circuit 28 is programmed to compare the fuel level sensed by the fuel level sensor 48 to a threshold fuel level that is stored in the memory of the control circuit 28 and then alter the schedule 64 when the fuel level is less than the threshold. This feature allows the control circuit 28 to calculate a schedule that can be accomplished within the limits placed on the operation of the engine 18 by the available fuel.

The system 10 also includes a carbon monoxide sensor 49 that senses and communicates the level of carbon monoxide in the atmosphere proximate to the marine vessel 12 to the control circuit 28, for example the CCMs 28*a*. Carbon monoxide sensors 49 for sensing and communicating carbon monoxide level in atmosphere and communicating same to a control circuit 28 are known in the art, one example of which can be commercially purchased from Fireboy-Xintex. The control circuit 28 is programmed to compare the sensed carbon monoxide level to a threshold carbon monoxide level that is stored in the memory of the control circuit 28 and then alter the noted schedule when the carbon monoxide level is greater than the threshold. This feature allows the system 10 to operate safely in situations where elevated carbon monoxide levels are present. For example, if the carbon monoxide level sensed by the sensor 49 is elevated above the threshold, the control circuit 28 can be programmed to turn off one or more of the engines 18.

FIGS. 5-8 depict examples of methods for controlling the hybrid propulsion system 10 according to different respective combinations of time criteria and user-desired operational characteristics entered at the user input device 30. These examples are non-limiting and are provided for understanding of the concepts of the programming of control circuit 28 and related method steps. The exact method and steps undertaken by the control circuit 28 will vary depending upon the specific combinations of time criteria and user-desired operational characteristics input to the input device 30.

Figure 5:
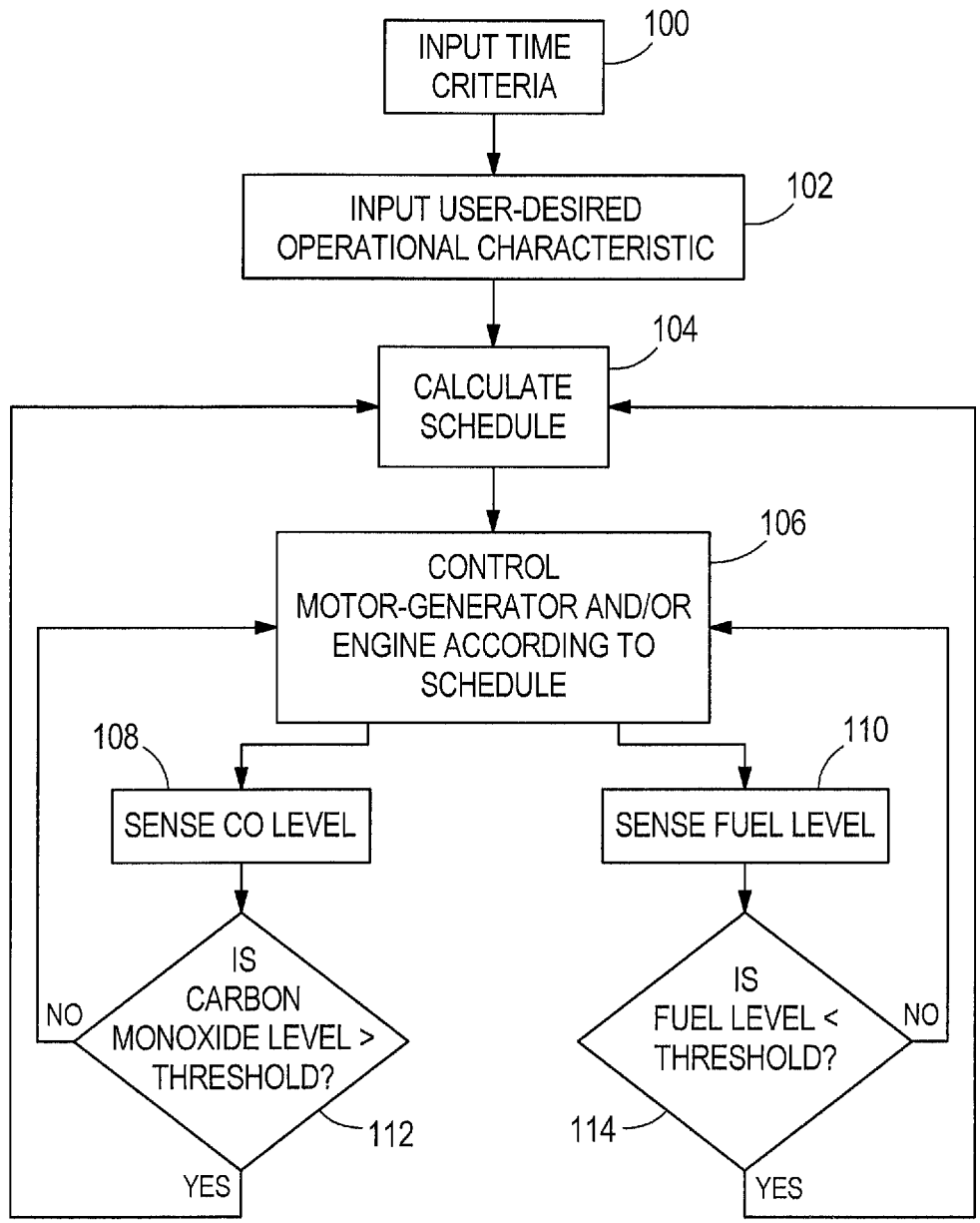
FIG. 5 is a flow chart illustrating another example of a method of operating a propulsion system for a marine vessel.

FIG. 5 depicts one example of a method for controlling the hybrid propulsion system 10 for the marine vessel 12 according to the present disclosure. At step 100, a user inputs time criteria to the control circuit 28 via the input device 30. As discussed herein above, the time criteria can include for example a time of day and/or a time period having a start time and an end time. At step 102, the user inputs at least one user-desired operational characteristic to the control circuit 28 via the user input device 30. As discussed herein above, the user-desired operational characteristic(s) can include a target SOC 54, wherein the schedule calculated by the control circuit 28 includes the step of controlling operation of the motor-generators 16 to charge the batteries 26 to the target SOC within the noted time criteria. The user-desired operational characteristic(s) can further or alternately include a target ROC 56 of the batteries 26, wherein the schedule calculated by the control circuit 28 includes the step of controlling operation of the motor generator 16 to charge the battery 26 at the target ROC 56 within the time criteria. The user-desired operational characteristic(s) can further include a request for continuous charging of the battery 26, wherein the schedule calculated by the control circuit 28 includes the step of controlling operation of the motor-generators 16 to continuously charge the batteries 26 within the time criteria. In addition or alternately, user-desired operational characteristic(s) can include a request for delayed charging of the batteries 26, wherein the schedule calculated by the control circuit 28 includes the step of delaying operation of the motor-generators 16 to delay charging of the batteries 26 as long as possible within the time criteria while still achieving other user-desired operational characteristics such as a target SOC. The user-desired operational characteristic(s) can also or alternately include an on/off state of one or more of the engines 18, wherein the schedule calculated by the control circuit 28 includes the step of controlling the on/off state 62 of all of some of the engines 18 within the time criteria. Steps 100 and 102 can be discrete steps or can include selection of a pre-set mode stored in the memory of the control circuit 28. At step 104, the control circuit 28 calculates the schedule based upon the inputted time criteria 50, 52 and user-desired operational characteristic(s) 54, 56, 58, 60, 62. In step 106, the control circuit 28 controls operation of the motor-generators 16 according to the calculated schedule.

With continued reference to FIG. 5, at step 108, a carbon monoxide level in atmosphere proximate the marine vessel 12 is sensed by the carbon monoxide sensor 49 and communicated to the control circuit 28. At step 112, the control circuit 28 compares the carbon monoxide level to a threshold carbon monoxide level stored in the memory of the control circuit 28. If the sensed carbon monoxide level is greater than the threshold, at step 104, the control circuit 28 recalculates the schedule based on this information. For example, the control circuit 28 typically will change the engine state 62 to off to avoid carbon monoxide poisoning to the user. If the carbon monoxide level is less than the threshold, at step 106, the control circuit 28 continues to control the motor-generators 16 and/or engine 18 according to the schedule previously calculated at step 104. At step 110, the fuel level of the system 10 is sensed by fuel level sensor 48 and communicated to the control circuit 28. At step 114, the control circuit 28 compares the fuel level to a threshold fuel level stored in the memory of the control circuit 28. If the fuel level is less than the threshold, at step 104, the control circuit 28 recalculates the schedule based on this information. For example, the control circuit 28 may change the ROC or the on/off state of one or more of the engines 18 in order to achieve other user-desired operational characteristics such as SOC. If the fuel level is greater than the threshold, at step 106, the control circuit 28 continues to control the motor-generators 16 and/or engine 18 according to the schedule calculated at step 104.

Figure 6:
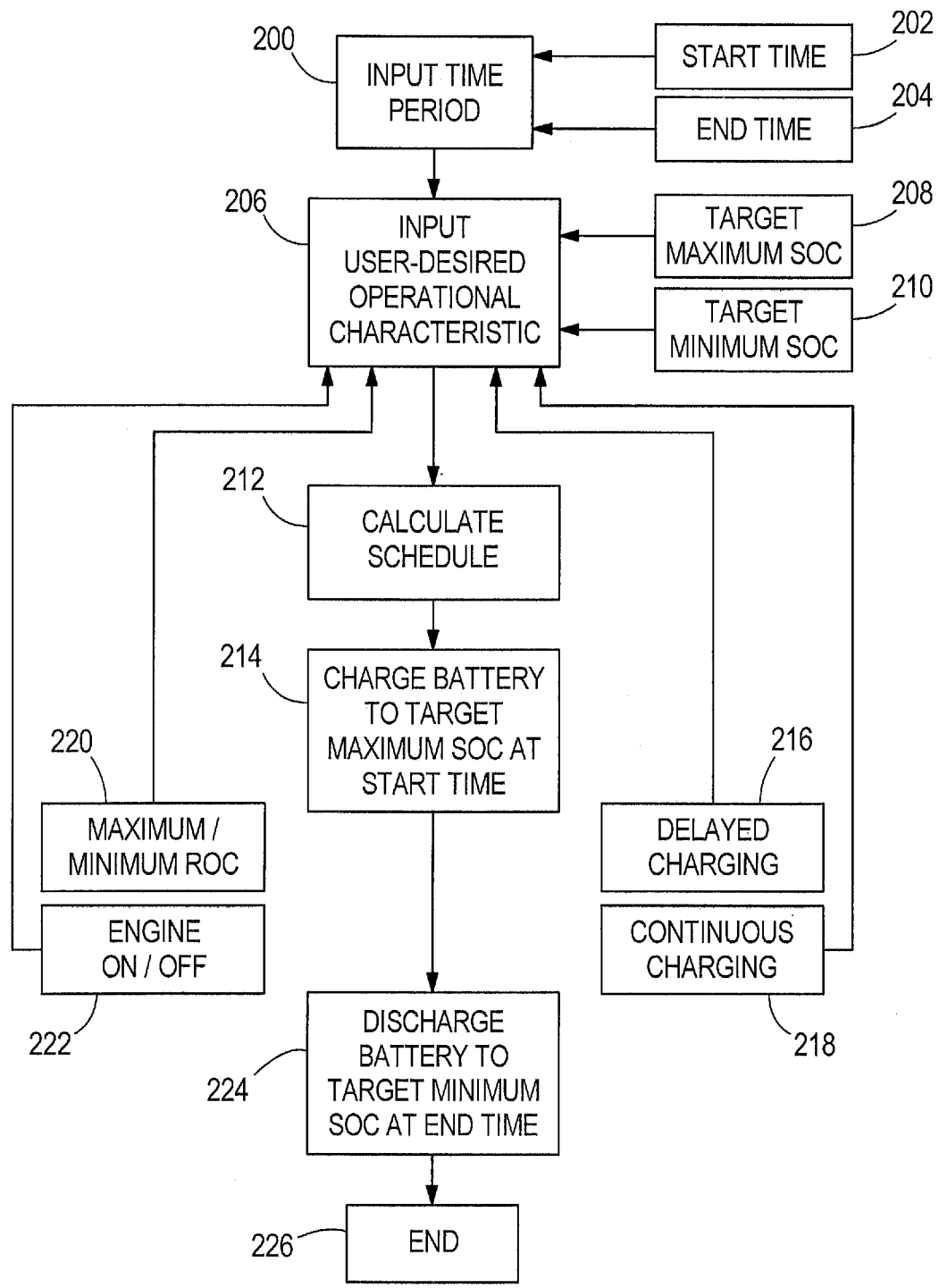
FIG. 6 is a flow chart illustrating another example of a method of operating a propulsion system for a marine vessel.

FIG. 6 depicts another example of a method of controlling the hybrid marine propulsion system 10 for the marine vessel 12. At step 200, the user inputs a time criteria to the user input device 30. In this example, the time criteria includes a time period wherein the user inputs a start time at step 202 and an end time at step 204. The user input device 30 communicates the time period to the control circuit 28. At step 206, the user inputs one or more operational characteristic(s) to the user input device 30, which in this example include at step 208 a target maximum SOC, at step 210 a target minimum SOC, at step 216 a request for delayed charging during the time criteria or at step 218 a request for continuous charging during the time criteria, at step 220 a target maximum and/or minimum ROC, and/or at step 222 an on/off state of one or more of the engines 18. Steps 200-210 and 216-222 can be undertaken as distinct steps by the user, or alternately can be inputted via a single selection by the user in the form of a mode that is pre-programmed with selected time criteria and operational characteristic(s). The user input device 30 communicates the user-desired operational characteristics to the control circuit 28. At step 212, the control circuit 28 calculates a schedule for charging of the batteries 26 with the motor-generator 16 and for discharging the batteries 26 to the house load 27 of the marine vessel 12. At step 214, the control circuit 28 follows the schedule it has calculated at step 212 to thereby charge the batteries 26 to the target maximum SOC recorded at step 208 by the start time inputted at step 202. After the start time inputted at step 202, the control circuit at step 224 controls the system 10 to discharge the batteries 26 to the target minimum SOC inputted at step 210 by the end time inputted at step 204. Step 224 is further accomplished while adhering to the remaining user-desired operational characteristics input at steps 200-210 and 216-222. At step 226, the schedule is ended.

Figure 7:
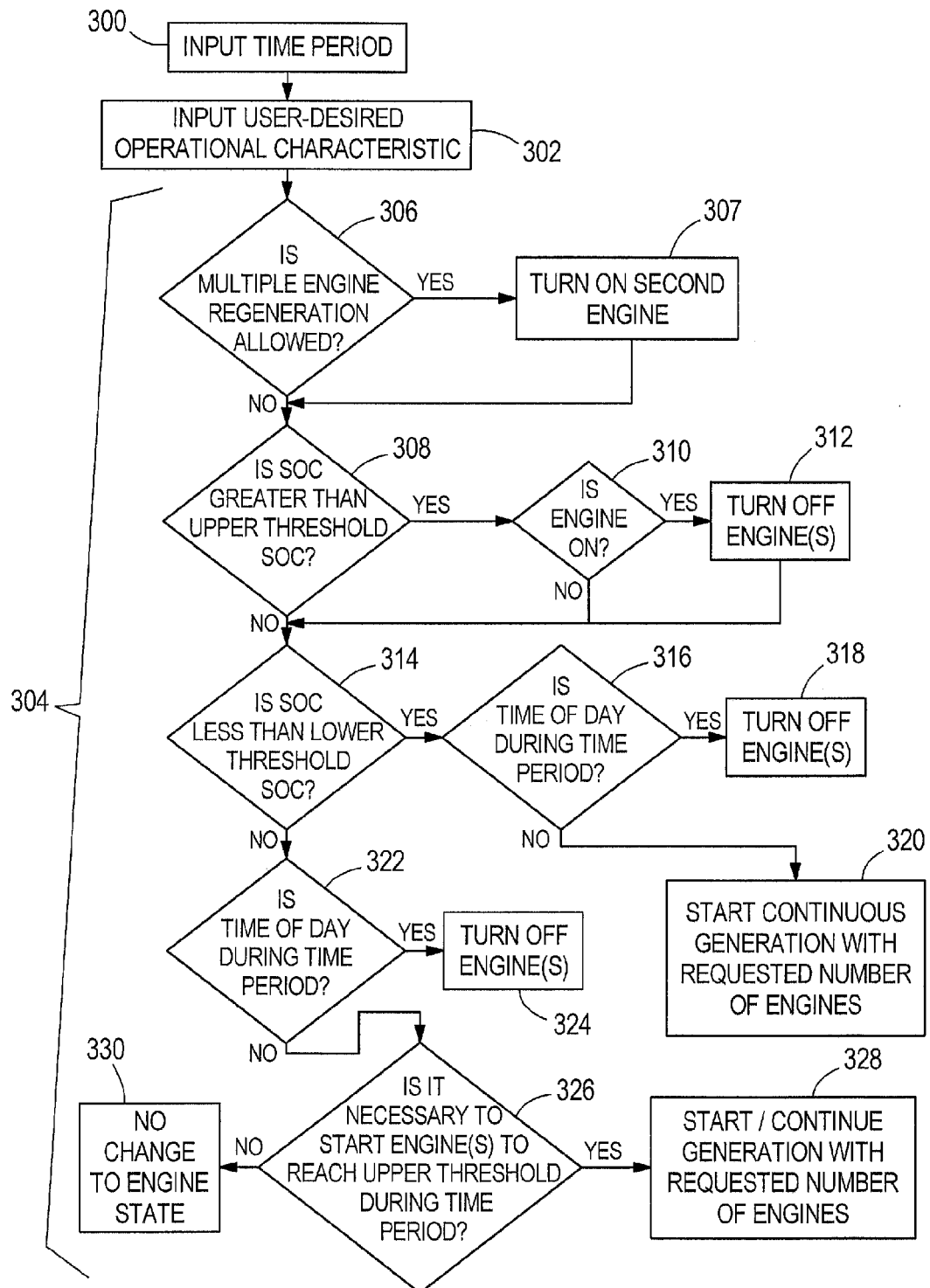
FIG. 7 is a flow chart illustrating another example of a method of operating a propulsion system for a marine vessel.

FIG. 7 depicts another example of a method of controlling the hybrid marine propulsion system 10. In this example, the user generally desires the system 10 to remain as quiet as possible, with minimal operation of the engines 18, for example during night time hours when the vessel 10 is away from a source of shore power. At step 300, the user inputs time criteria to the input device 30 including a time period having a start time and an end time during which time period the noted quiet operation is desired. At step 302, the user inputs user-desired operational characteristics to the system 10 via the user input device 30. The user-desired operational characteristics optionally can include a desired on/off state of one or more of the engines 18, a request for delayed charging during the time period to maintain quiet, and optionally an upper threshold SOC and/or a lower threshold SOC. Alternately the upper and lower threshold values could already be stored in the memory of the control circuit 28. At step 304, the control circuits 28 calculates a schedule for charging the batteries 26 during the time criteria by operating the motor-generators 16 and discharging the batteries 26 to the house load 27 of the marine vessel 12. In this particular example, at step 306, the control circuit 28 determines whether the user has requested a specific on/off state of the engines 18. In other words, the control 28 determines whether both engines 18a, 18b can be utilized for regeneration in Hybrid Mode during the time criteria. If yes, at step 307, the control circuit 28 if necessary starts the engine 18b. If no, the control circuit 28 continues to step 308 without turning on the second engine 18b. At step 308, the control circuit 28 determines a present SOC of the batteries 26 and compares the present SOC to an upper threshold SOC that is saved in the memory of the control circuit 28 or otherwise input by the user to the input device 30. If the present SOC is greater than the upper threshold SOC, the control circuit 28, at step 310, determines whether the engines 18 are on. If yes, at step 312, the control circuit turns off the engines 18 because charging of the batteries is not needed. If at step 308 the result is no, the control circuit 28 continues on to step 314. At step 314, the control circuit 28 determines whether the present SOC is less than a lower threshold SOC saved in the memory of the control circuits 28 or otherwise input by the user to the input device 30. If yes, at step 316, the control circuit 28 determines whether the present time of day is during the time period input at step 300. If yes, at step 318, the control circuit turns off the engines 18. If no, at step 320, the control circuits 28 starts continuous generation with the number of engines that were permitted to operate (i.e. given an "on status") by the user via the user input device 30. At step 314, if the answer is no, then at step 322, the control circuit 28 determines whether the current time of day is during the time period entered by the user at step 300. If yes, at step 324, the control circuit 28 turns off the engine(s) 18. If no, at step 326, the control circuit 28 determines whether it is necessary to start the engines 18 to reach the upper threshold SOC during the time period entered by the user at step 300. This determination can be made by the following equation:

$$\text{Num\_of\_Engines\_Allowed} * SOC_{perhour} \leq \frac{SOC_{target} - SOC_{current}}{\text{Time}_{target} - \text{Time}_{current}}$$

If no, at step 330, the control circuit 28 does not change the on/off state of the engines 18. If yes, at step 328, the control circuit 28 turns on the engines 18 or continues generation with the number of engines 18 requested by the user at step 300.

Figure 8:
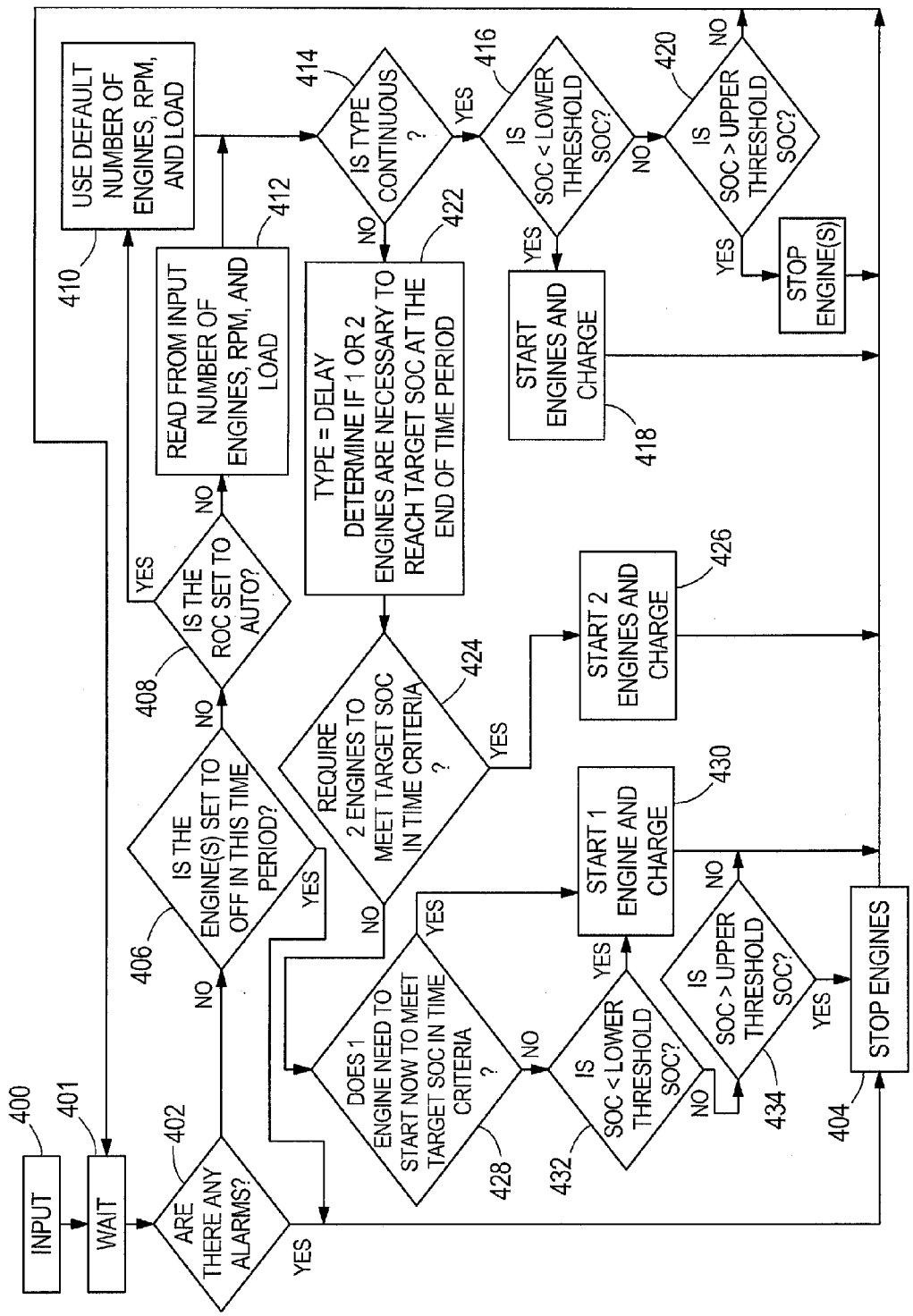
FIG. 8 is a flow chart illustrating another example of a method of operating a propulsion system for a marine vessel.

FIG. 8 depicts another functional example of a method of controlling the hybrid marine propulsion system 10. At step 400, the user inputs to the input device 30 time criteria and user-desired operational characteristics including on/off state of one or more of the engines 18, continuous or delayed charging of the batteries during the time criteria, target SOC of the batteries 26, and target ROC of the batteries 26. At step 401, the control circuit 28 waits for a next software iteration. At steps 402-434, the control circuit 28 calculates a schedule for charging and discharging the batteries 26, as follows. At step 402, the control circuit 28 determines whether there are any current alarms, such as for example whether the carbon monoxide level is above a threshold carbon monoxide level saved in the memory of the control circuit 28 or whether the fuel level is below a threshold fuel level saved in the memory of the control circuit 28. The structure and functionality for this step is described with reference to FIG. 5 herein above, steps 108-114. If yes, the control circuit 28 at step 404 stops operation of the engines 18. If no, at step 406, the control circuit 28 determines whether one or more of the engines 18 are requested to be "off" by the user within the present time period. If yes, the control circuit 28, at step 404, stops operation of the engines 18. If no, at step 408, the control circuit 28 determines whether the target ROC of the system 10 is set to "auto" by the user. If yes, at step 410, the control circuit 28 uses a default number of engines 18, operating at a default rpm and load, all of which can be stored in the memory of the control circuit 28 during initial set up of the system 10. If no, at step 412, the control circuit 28 reads from the input device 30 the on/off state of the engines 18, the rpm and the load input by the user to the input device 30 at step 400. At step 414, the control circuit 28 determines whether the user has requested via the input device 30 continuous charging of the batteries 26 during the time period. If yes, at step 416, the control circuit 28 determines whether the SOC is less than a lower threshold SOC saved in a memory of the control circuit 28. If yes, at step 418, the control circuit 28 starts the engines 18 and begins operation in Hybrid Mode to charge the batteries 26. If no, at step 420, the control circuit 28 determines whether the SOC is greater than an upper threshold SOC saved in a memory of the control circuit 28. If yes, at step 404, the control circuit 28 stops the engines. If no, the control circuit returns to step 401. If, at step 414, the user has not requested continuous charging at the present time, the control circuit 28 determines that the user requested delayed charging and then determines how many engines 18 are necessary to operate to reach the target SOC at the end of the time period entered by the user. This can be determined by the following equation:

$$\text{Num\_of\_Engines} = \text{round}\left(\frac{SOC_{target} - SOC_{current}}{(\text{Time}_{target} - \text{Time}_{current}) * SOC_{perhour}}\right)$$

At step 424, the control circuit 28 determines whether two engines 18 are required to meet the target SOC in the time criteria. This can be determined by the following equation:

$$\text{Num\_of\_Engines} = \text{round}\left(\frac{SOC_{target} - SOC_{current}}{(\text{Time}_{target} - \text{Time}_{current}) * SOC_{perhour}}\right)$$

If yes, at step 426, the control circuit 28 starts two engines 18 and begins charging of the batteries 26. If no, at step 428, the control circuit 28 determines whether one engine is necessary to start now to meet the target SOC within the time criteria. This can be determined by the following equation:

$$\text{Num\_of\_Engines\_Allowed} * SOC_{perhour} \leq \frac{SOC_{target} - SOC_{current}}{\text{Time}_{target} - \text{Time}_{current}}$$

If yes, at step 430, the control circuit 28 starts one engine 18 and begins charging. If no, at step 432, the control circuit 28 determines whether the present SOC is lower than a threshold SOC saved in the memory of the control circuit 28. If yes, the control circuit starts one engine at step 430. If no, at step 434, the control circuit 28 determines whether the present SOC is greater than an upper threshold SOC saved in a memory of the control circuit 28. If yes, the control circuit 28 stops engines at 404. If no, the control circuit 28 returns to step 401.

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

What is claimed is:

1. A method for controlling a hybrid propulsion system for a marine vessel, the method comprising:
   controlling with a control circuit an electric motor-generator according to at least two modes, including a first mode wherein the electric motor-generator receives power from a battery and rotates a driveshaft to drive a propulsor and a second mode wherein the electric motor-generator generates power to charge the battery based upon torque from an internal combustion engine;
   inputting to the control circuit a time criteria and at least one user-desired operational characteristic of at least one of the internal combustion engine, electric motor-generator, and battery;
   based on the time criteria and user-desired operational characteristic, calculating with the control circuit a schedule for at least one of charging the battery with the electric motor-generator and discharging the battery to a house load of the marine vessel; and
   controlling with the control circuit operation of the electric motor-generator according to the schedule.

2. The method according to claim 1, wherein the time criteria comprises a time of day.

3. The method according to claim 1, wherein the time criteria comprises a time period having a start time and an end time.

4. The method according to claim 1, wherein the user-desired operational characteristic comprises a target state of charge of the battery, and wherein the schedule calculated by the control circuit comprises controlling operation of the electric motor-generator to charge the battery to the target state of charge within the time criteria.

5. The method according to claim 1, wherein the user-desired operational characteristic comprises a target rate of charge of the battery, and wherein the schedule calculated by the control circuit comprises controlling operation of the electric motor-generator to charge the battery at the target rate of charge within the time criteria.

6. The method according to claim 1, wherein the user-desired operational characteristic comprises continuous charging of the battery, and wherein the schedule calculated by the control circuit comprises controlling operation of the electric-motor generator to continuously charge the battery within the time criteria.

7. The method according to claim 1, wherein the user-desired operational characteristic comprises a delayed charging of the battery, and wherein the schedule calculated by the control circuit comprises delaying operation of the electric-motor generator to delay charging of the battery within the time criteria.

8. The method according to claim 1, wherein the user-desired operational characteristic comprises an on-off state of the internal combustion engine; and wherein the schedule calculated by the control circuit comprises controlling the on-off state of the internal combustion engine within the time criteria.

9. The method according to claim 1, comprising sensing a carbon monoxide level in atmosphere proximate the marine vessel and further comprising comparing with the control circuit the carbon monoxide level to a threshold and then altering the schedule when the carbon monoxide level is greater than the threshold.

10. The method according to claim 1, comprising sensing a fuel level of the system and further comprising comparing with the control circuit the fuel level to a threshold and then altering the schedule when the fuel level is less than the threshold.

11. The method according to claim 1, wherein the time criteria comprises a time period having a beginning and an end, and wherein the user-desired operational characteristic comprises a target maximum state of charge of the battery at the beginning of the time period and a target minimum state of charge of the battery at the end of the time period; and wherein the schedule calculated by the control circuit comprises controlling operation of the electric motor-generator to charge the battery to the target maximum state of charge at the beginning of the time period and thereafter controlling operation of the electric motor-generator to achieve the target minimum state of charge at the end of the time period.

12. The method according to claim 11, wherein the time criteria further comprises a delayed charging of the battery, wherein the schedule calculated by the control circuit comprises delaying charging of the battery by delaying operation of the electric motor-generator for part of the time period.

13. The method according to claim 11, wherein the time criteria further comprises a target rate of charge of the battery, and wherein the schedule calculated by the control circuit comprises controlling operation of the electric-motor generator to charge the battery at the target rate of charge.

14. The method according to claim 11, wherein the user-desired operational characteristic comprises an on-off state of the internal combustion engine and further wherein the schedule calculated by the control circuit comprises controlling the on-off state of the internal combustion engine within the time period.

15. A hybrid propulsion system for a marine vessel comprising:
   a marine propulsor coupled to a driveshaft, wherein the propulsor propels the marine vessel upon rotation of the driveshaft;
   an internal combustion engine;
   an electric motor-generator coupled to the internal combustion engine so that torque from the internal combustion can be received by the electric motor-generator; wherein the electric motor-generator operates in at least two modes, including a first mode wherein the electric motor-generator rotates the driveshaft to drive the propulsor and a second mode wherein the electric motor-generator generates power based upon torque from the internal combustion engine;
   a battery electrically coupled to the electric motor-generator; wherein the battery provides power to the electric motor-generator in the first mode and is charged by the electric motor-generator in the second mode, and further wherein the battery also is electrically coupled to and discharges power to a house load of the marine vessel;
   a control circuit that controls operation of the internal combustion engine and the electric motor-generator in the first mode and in the second mode; and
   a user input device that inputs a time criteria and at least one user-desired operational characteristic of at least one of the internal combustion engine, electric motor-generator, and battery;
   wherein based on the time criteria and the user-desired operational characteristic, the control circuit calculates a schedule for charging the battery by operating the electric motor-generator and discharging the battery to the house load of the marine vessel; and
   wherein the control circuit controls operation of the electric motor-generator in at least the second mode and according to the schedule.

16. The system according to claim 15, wherein the time criteria comprises a time of day.

17. The system according to claim 15, wherein the time criteria comprises a time period having a start time and an end time.

18. The system according to claim 15, wherein the user-desired operational characteristic comprises a target state of charge of the battery and further wherein according to the schedule calculated by the control circuit, the electric motor-generator is operated to charge the battery to the target state of charge within the time criteria.

19. The system according to claim 15, wherein the user-desired operational characteristic comprises a target rate of charge of the battery and further wherein according to the schedule calculated by the control circuit, the electric motor-generator is operated to charge the battery at the target rate of charge within the time criteria.

20. The system according to claim 15, wherein the user-desired operational characteristic comprises a continuous charging of the battery and further wherein according to the schedule calculated by the control circuit, the electric motor generator is continuously operated to continuously charge the battery within the time criteria.

21. The system according to claim 15, wherein the user-desired operational characteristic comprises a delayed charging of the battery and wherein according to the schedule calculated by the control circuit operation of the electric motor-generator is delayed so as to delay charging of the battery within the time criteria.

22. The system according to claim 15, wherein the user-desired operational characteristic comprises an on-off state of the internal combustion engine and further wherein according to the schedule calculated by the control circuit, the on-off state of the internal combustion engine is controlled within the time criteria.

23. The system according to claim 15, comprising a carbon monoxide sensor that senses and communicates a carbon monoxide level in atmosphere proximate to the marine vessel to the control circuit; wherein the control circuit compares the carbon monoxide level to a threshold and then alters the schedule when the carbon monoxide level is greater than the threshold.

24. The system according to claim 15, comprising a fuel level sensor that senses and communicates fuel level of the system to the control circuit; wherein the control circuit compares of the fuel level to a threshold and then alters the schedule when the fuel level is less than the threshold.

* * * * *